Feb. 22, 1955 J. E. JENDRISAK 2,702,445
APPARATUS FOR BENDING SHEETS OF GLASS OR LIKE MATERIALS
Filed April 20, 1951 3 Sheets-Sheet 1

Inventor
Joseph E. Jendrisak
By Nobbe & Swope
Attorneys

Feb. 22, 1955 J. E. JENDRISAK 2,702,445
APPARATUS FOR BENDING SHEETS OF GLASS OR LIKE MATERIALS
Filed April 20, 1951 3 Sheets-Sheet 2
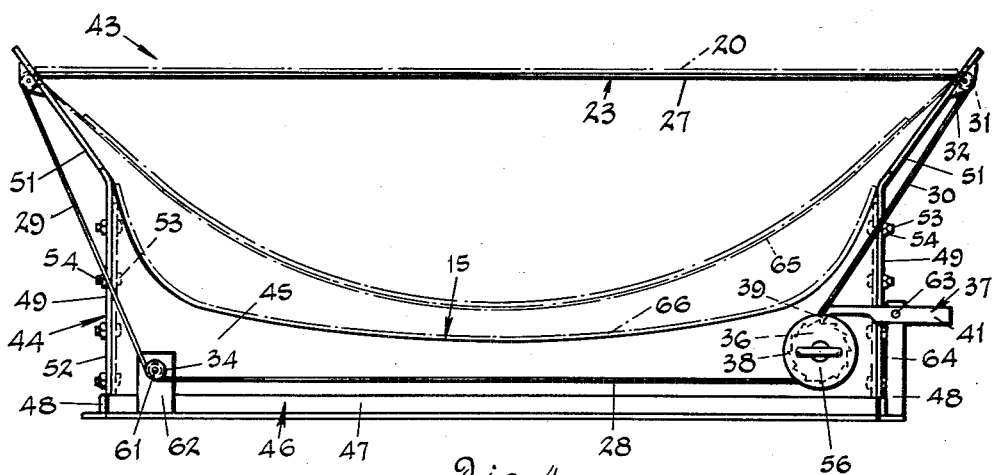
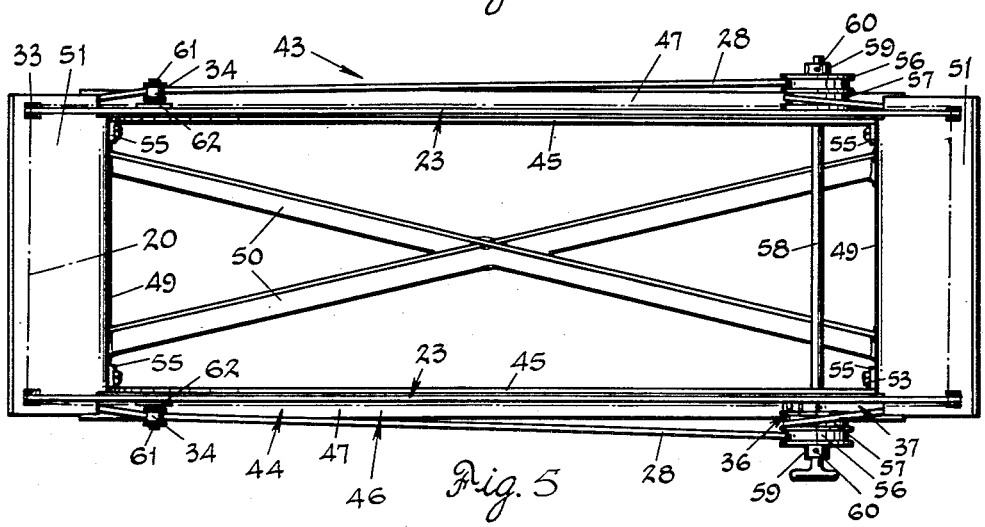
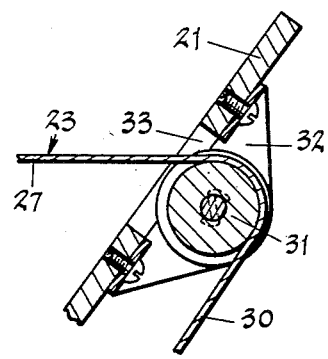
Inventor
Joseph E. Jendrisak
Nobbe & Swope
By
Attorneys Feb. 22, 1955 J. E. JENDRISAK 2,702,445
APPARATUS FOR BENDING SHEETS OF GLASS OR LIKE MATERIALS
Filed April 20, 1951 3 Sheets-Sheet 3

Inventor
Joseph E. Jendrisak
By Nobbe & Swope
Attorneys

United States Patent Office 2,702,445
Patented Feb. 22, 1955

2,702,445

APPARATUS FOR BENDING SHEETS OF GLASS OR LIKE MATERIALS

Joseph E. Jendrisak, Rossford, Ohio, assignor to Libbey-Owens-Ford Glass Company, Toledo, Ohio, a corporation of Ohio Application April 20, 1951, Serial No. 222,005

10 Claims. (Cl. 49—67)

The present invention relates broadly to the bending of glass sheets or plates, or like sheet materials.

In the bending of glass sheets, it has become customary to support a flat sheet of glass to be bent at its opposite ends only above a concave mold having a shaping surface of desired curvature and to then heat the glass in a furnace and allow it to settle freely, upon softening, into conformity with the shaping surface of the mold. However, it has been found that this method of supporting the glass sheet to be bent is not always entirely satisfactory, particularly in the bending of relatively large and/or thin sheets of glass to relatively deep or accentuated curvatures as it often results in glass breakage and inaccurate bends. This invention, therefore, has to do with an improved apparatus by which flat sheets of glass of relatively large dimensions can be more readily and satisfactorily bent to predetermined curvatures.

It is an aim of this invention to provide an improved apparatus for bending sheets of glass and which are especially adapted for, although not limited to, the bending of relatively large and/or thin sheets of glass to deep or accentuated curvatures and wherein said sheets are bodily supported throughout substantially the bending operation.

Another object of the invention is to provide such an apparatus wherein a flat sheet of glass to be bent is supported in a substantially horizontal position above a mold having a shaping surface conforming to the shape of the finally bent sheet and allowing it to settle as it becomes heated, while maintaining support therefor, and finally removing the support and allowing the sheet to rest upon the mold in conformity therewith.

Another object of the invention is to provide an apparatus for bending glass sheets embodying a mold having shaping surfaces curved to conform to the curvature of the bent sheet, and means for supporting the glass sheets above said mold which will sustain the weight of the glass while said sheet is being heated and during the settling thereof toward and into conformity with the shaping surfaces of the mold.

Another object of the invention is to provide a bending apparatus of the above character which includes a mold having shaping surfaces of a predetermined curvature and flexible means for supporting a glass sheet to be bent in a substantially horizontal manner along its opposed longitudinal edges and for subsequently lowering the sheet, upon heating and softening of the glass, in a substantially vertical direction into conformity with said shaping surfaces.

A further object of the invention is to provide in bending apparatus of the above character, longitudinally extending, parallel flexible members which are adapted to support a flat glass sheet to be bent along opposed marginal edges while the sheet is settling downwardly from the flat into a curvature produced by the curved shaping surfaces of the mold.

A further object of the invention is to provide in bending apparatus of the above character, a pair of flexible metal tapes for supporting a flat glass sheet above the mold, and means for actuating the metal tapes so that they will sustain the glass sheet when flat and provide support for the same during the heating and settling thereof into conformity with the shaping surfaces of the mold.

Other objects and advantages of the invention will becomes more apparent during the course of the following description, when taken in connection with the accompanying drawings.

In the drawings, wherein like numerals are employed to designate like parts throughout the same:

Fig. 4 is a side elevation of a modified form of bending apparatus;

Fig. 5 is a plan view of the construction shown in Fig. 4;

Fig. 6 is a cross-sectional detail view of the tape supporting roll and its mounting on the apparatus;

Bending apparatus provided in accordance with this invention is particularly well adapted for the shaping of relatively large and/or thin glass sheets which, by reason of their dimensional size and thickness, are quite susceptible to breakage during the heating and shaping operations. It has been found that when supporting relatively large, and especially large and thin, sheets in a horizontal position above a mold, there is a tendency for the sheets, by reason of their own sustained weight, to sag and in some instance actually break either before heating of the sheet takes place or during the early stages of heating and bending. This has been found particularly true when the sheets are being bent to deep or accentuated curvatures. This invention concerns a method and apparatus for eliminating, or reducing to a minimum, liability of glass breakage and contemplates the provision of means for initially supporting the flat sheet along both its transverse and longitudinal marginal edges above the mold while the body portion thereof is left unsupported. The glass sheet is then heated, while supported in this manner, to substantially its softening point and the supporting means is operable to follow the transitional, settling conditions of the glass and to assimilate such changes in the condition of the glass that it may then be gradually and bodily lowered into conformity with the mold. Once the glass sheet has been fully bent to the contour of the mold, this particular embodiment of supporting means is movable out of contact with the glass so that, at completion of the bending operation, the glass sheet rests or is supported entirely on the mold shaping contours or surfaces.

Figure 1:
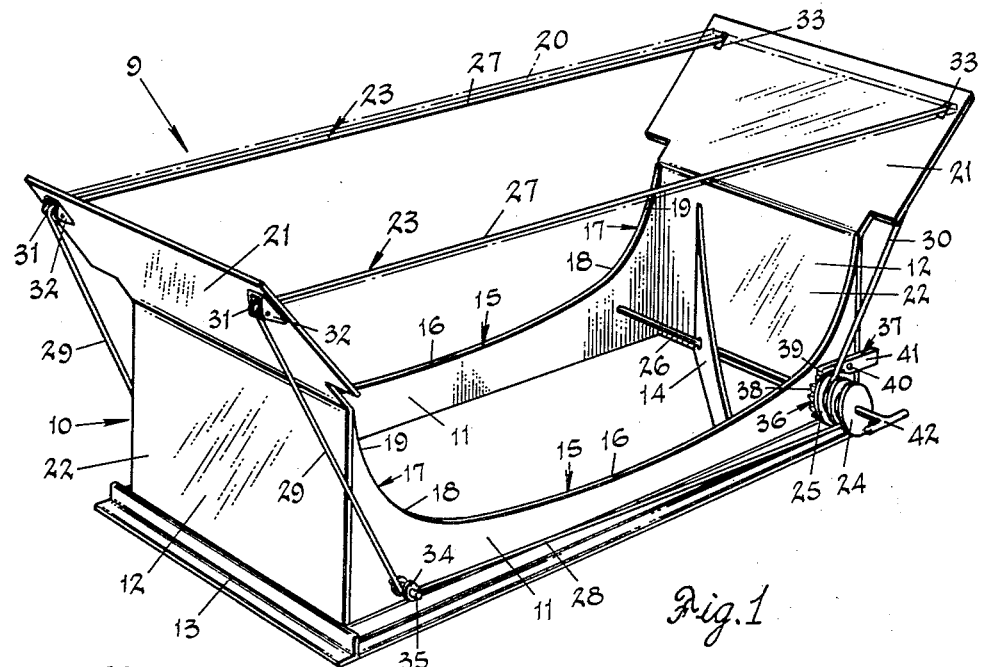
Fig. 1 is a perspective view of glass bending apparatus constructed in accordance with the present invention.
Figures 2, 3:
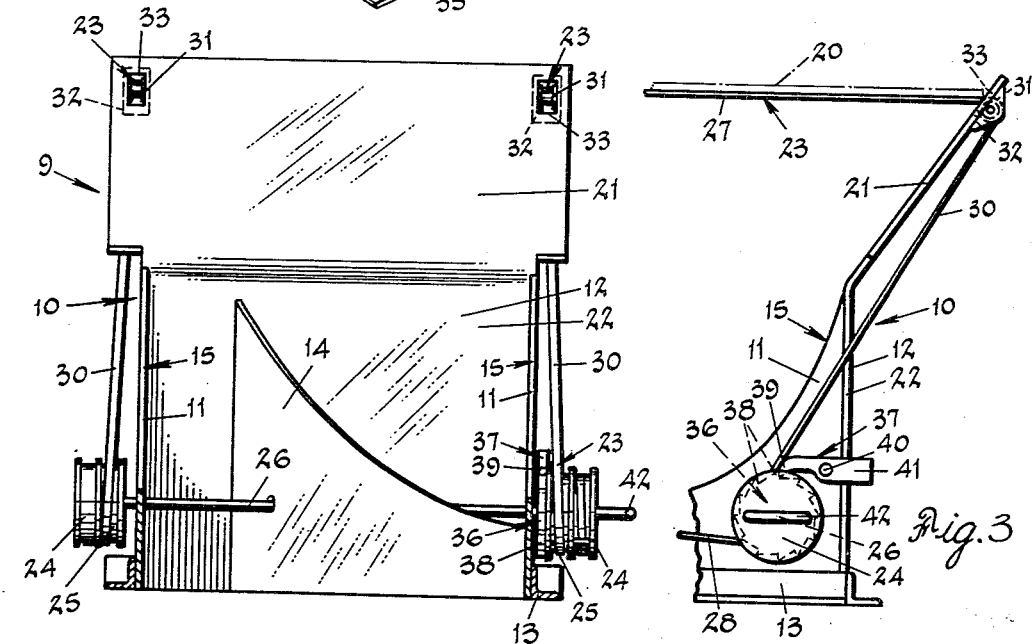
Fig. 2 is a vertical transverse sectional view of the bending apparatus.
Fig. 3 is a fragmentary view of a corner of the bending apparatus.

Referring now particularly to Figs. 1, 2 and 3 of the drawings, there is disclosed one form of bending apparatus constructed in accordance with the invention and designated in its entirety by the numeral 9. This apparatus comprises a substantially rectangular mold 10 which is made up of opposite side walls 11 and end walls 12. Obviously, however, the mold may be constructed according to other and various desired outlines of glass to be furnished in finally bent form.

The side walls 11 and end wall 12 are preferably secured together by welding or the like methods, along their vertical abutting end edges to form a rigid mold construction. An angle iron base or frame 13 may be employed to reenforce the mold and is secured to the lower margins of the side walls 11 and end walls 12. The mold 10 may be further strengthened against body distortion by the installation of gussets or bracing plates 14 that are arranged in diagonal relation between the side and end walls 11 and 12 respectively.

The upper edges of the side walls 11 are contoured to provide shaping surfaces 15 which, by way of example, are herein illustrated as being of a particularly deep curvature which may resemble a U in elevation and be described by a central area 16 of relatively shallow contour and sharply rising end areas 17. As will be noted, the end areas 17 originate in arcs of small radius, as indicated at 18, and continue upwardly and outwardly along arcuate surfaces described by a materially greater radius as indicated at 19. As indicated above, the character of the curvature to be obtained in the glass sheet may be developed in any variation or combination of single or multiple curves, the result of which may be achieved by properly contouring the upper edges of the side walls.

To accommodate a glass sheet of suitable dimension, such as the sheet indicated at 20, according to the required length of arc to be maintained in the finally bent sheet, the end walls 12 of the mold are provided with upwardly and outwardly directed portions 21 to increase the over-all length of the mold, which portions are also materially wider than the width of the mold so as to substantially overhang the side walls 11. These upwardly extended portions or ears 21 are arranged in outwardly directed, divergent angles with respect to each other and are deflected from the lower, vertical portions 22 of the end walls 12 at substantially the upper extremities of the ends of the side walls 11. According to the type of bend to be obtained, the angle at which the ears extend angularly upward may or may not be such as to create tangential or "fared" surface extensions from the adjoining ends of the shaping surfaces 15.

As herein provided, the glass sheet 20 is supported along its longitudinal marginal edges and laterally outward from the shaping surfaces 15 in such a manner that the glass may be heated to substantially its softening point and then immediately lowered onto said surfaces without physical interference of the supporting elements during the final stages of the bending operation. That is to say—the supporting elements are located in substantially parallel relation to the shaping surfaces but outwardly thereof so that the longitudinal marginal portions of the sheet eventually contacting the said surfaces will be disposed inwardly of the adjoining marginal portions supported by the elements. In handling the glass while in a softened condition or to satisfactorily allow the sheet to settle centrally as it becomes softened, it has been found preferable to provide a form of support element having sufficient flexibility to progressively sag in conformity with the settling sheet. By so supporting the glass and despite the fact that the body of the sheet is substantially unsupported, it is impossible for the weight thereof at any time in the bending operation to create tensional stresses. In the course of the bending operation, the glass will thus never be subjected to any appreciable internal tensional stresses and yet will be handled so that it may be gradually lowered onto and freely released into bent conformity with the surfaces of the mold.

For this purpose and to obtain an entirely flexible medium of support, continuous ribbons or tapes of such metals as Nichrome, in strip or braided form, are employed. The continuous tapes 23 are arranged, one on either side of the mold, and are wound or unwound from pairs of fixedly associated reels 24 and 25 located outwardly of the opposite side walls 11. The reels are mounted on a shaft 26 extending transversely through and journaled in the side walls. The tapes are wound in what may be termed an "overhand" and "underhand" fashion so that turning of the shaft 26 will operate to feed out or take in tape from opposite directions and thereby equally increase or decrease the effective length of the tapes.

More particularly, the tapes 23 are trained about supporting or guiding spools or rollers in such a manner that one portion thereof may be defined as a horizontally disposed upper flight 27 and another portion as a lower flight 28; the lower flight continuing into the upper flight 27 through an upwardly directed intermediate portion 29 at one end of the mold while continuation of the upper flight at the opposite end of the mold is through a downwardly directed intermediate portion 30. The continuity of each tape 23 may thus simply be defined as a lower flight 28 from the reel 24 continuing upwardly through the intermediate portion 29 into the upper flight 27 and continuing downwardly through the portion 30 to the reel 25. Consequently when the reels are turned in one direction, the unwound portions of the tapes will be increased in their overall continuity and produce a slack in the upper flight 27 while rotation of the reels in the opposite direction will reduce the available length of the tapes with a resulting development of tautness.

The upper flights 27 of each tape 23 are supported on rollers 31 arranged at the opposite ends of the mold 10 and in order that the said tapes will descend, in vertical planes outside of the side walls 11, the rollers 31 are located in the overhanging margins of the ears 21. The rollers 31 are rotatably carried in brackets 32 secured to the outer surfaces of the ears 21 and in alignment with openings 33 through which the tapes 23 pass as shown in Fig. 6. Preferably the openings 33 are arranged in the ears 21 in the vicinity of their upper edges and in horizontal alignment with one another so that registering pairs of rollers 31 will support the tapes in substantial parallelism and in a substantially horizontal plane when the flat glass is placed thereon, and provide a maximum area of support for the glass as afforded by the upper flight portions 27 of the tapes.

The shaft 26 is preferably located in the lower corner of one end of the mold 10 and the lower flight portions 28 are trained about rollers 34 in the opposite lower corner. The tape in said lower flights 28 will thus be guided from the reels 24, about the rollers 34 and in an upwardly directed course to rollers 31 at the related end of the mold. The rollers 34 may be freely or fixedly mounted on an associated shaft 35 extending transversely of the mold and being journaled in the side walls 11.

The shaft 26, on which the pairs of reels 24 and 25 are mounted, is restrained to one direction of free rotation by means of a ratchet wheel and pawl arrangement designated by the numerals 36 and 37. The ratchet wheel 36 is securely mounted on the shaft 26 and teeth 38 are formed in the periphery thereof so that during engagement with the toothed end 39 of the pawl 37, the said shaft will be restrained from turning so as to unwind or produce an inadvertent slack condition in the tapes. The pawl 37 is pivotally supported on a pin 40 carried by the adjacent side wall 11 and has formed, at its end opposite the tooth 39, a weighted enlargement 41 which is slightly heavier than the toothed end.

The shaft 26 is also provided at one end with a T-shape or handle 42 by means of which the shaft can be rotated to produce the desired tautness in the tapes or to unwind the same during the bending operation. When the apparatus is in readiness for bending a sheet of glass, the shaft is turned by the handle 42 to wind the tapes onto the pairs of reels 24 and 25 until the upper flights 27 thereof present taut, horizontally disposed surfaces at which time the toothed end 39 of the pawl 37 is placed in engagement with the teeth 38 of the ratchet wheel 36. When the sheet of glass 20 is placed upon the tapes 23, the influence of its weight will increase the taut condition of said tapes and consequently strive to rotate the pairs of reels 24 and 25. Now, since the pawl is in engagement with the ratchet wheel, rotation of the shaft 26 and said reels is prevented while, in a concurrent manner, the back pressure directed to the ratchet wheel 36 prevents the weighted end 41 of the pawl 37 from lifting the opposite or toothed end 39 out of engagement.

While the mold 10 of the bending apparatus 9 can be constructed as a rigid body, as hereinbefore set forth, it can also be assembled so that the side walls, on which the shaping surfaces are contoured, may be readily removed and other walls having shaping surfaces of a different contour easily substituted therefor. In a modified embodiment of the invention, the apparatus, as illustrated in Figs. 4 and 5, may therefore partake of the same general appearance as that shown in Figs. 1, 2 and 3; however, as set forth, the modified bending apparatus will comprise a mold 43, having a frame 44 to which the side walls 45 are removably secured.

The frame 44 includes a base 46 formed by longitudinally arranged angle irons 47, transverse angle iron sections 48 and vertically disposed end walls 49. To reenforce the frame 44, the base 46 is provided with a pair of angles 50 which are arranged in the form of an X in the center area of said frame and secured at their respective ends to the adjacent end walls 49.

The end walls are formed to provide angularly disposed ears 51 which are bent outwardly from the lower vertical portions 52, said ears 51 also being wider than lowered portions 52, as previously explained in connection with the ears 21. In substantially the corners of the mold and, more particularly, at regularly spaced points along the margins of the vertical portions 52 of the end walls, a series of holes are provided for receiving bolts 53. The bolts 53 and nuts 54 are adapted to secure the side walls 45 of the mold to the related end walls 49, said side walls having angularly disposed flanges 55 that are equipped with registering holes for receiving the bolts. Upon removal of the nuts and bolts from the associated end walls 49 and flanges 56, the side walls 45 may be removed from the frame 44 and other similarly formed walls located in their stead.

Since the side walls of the modified mold 43 are removably associated with the frame 44, means is also herein provided for reducing the details of a consequent change-over to the minimum. The pairs of reels 56 and 57, similar to the pairs of reels 24 and 25 of the apparatus 9, are carried on a shaft 58 and are provided with collars 59 having locking screws 60 threadably located therein. The rollers 34 are journalled on pins 61 mounted in posts 62 secured to the side angles 47 of the frame 46. Also to assist changing the walls 45 of the mold, the pawl 37 is supported on a pin 63 mounted in a post 64 that is secured to an adjacent end angle iron 48. As a consequence of this construction when it becomes desirable to produce the bend of a different contour, as may be highly advantageous in connection with specialized bending programs, the screws 60 are turned to release the reels 56 and 57 so that the shaft 58 can be withdrawn from its journals in the side walls 45. The bolt and nut connections are now removed from the end walls 49 after which the said side walls may be removed from the frame 44. Obviously when it becomes necessary to shift from one form of bend to another while retaining the advantages of the flexible tape support for the glass, the substitution feature of the modified mold construction becomes of prime importance.

In practice, the shaft 26 of the apparatus is turned by means of the handle 42 until the tapes 23 are stretched in a taut, substantially horizontal condition. The pawl 37 is now swung into engagement with the ratchet wheel 36 and the force exerted by the taut tapes will be directed with sufficient influence to the shaft 26 that the shaft will urge said ratchet to maintain such engagement with the pawl. This force, exerted by the taut tapes 23, will be accelerated by the weight of the flat glass sheet 20 when it is positioned on the tapes preparatory for the bending operation. In placing the glass sheet in bending relation above the shaping surfaces 15, it is preferably located in endwise relation thereto by determining that the ends of the sheet are equally spaced with respect to the surfaces of the ears 21. Ordinarily, as shown in Figs. 3 and 4, these ends of the sheet are in engaging contact with or supported by the surfaces of the ears while the body of the sheet is substantially unsupported above the shaping surfaces of the mold.

When the glass becomes softened at its bending temperature, the shaft 26 is rotated sufficiently to allow the weighted end 41 of the pawl 37 to automatically raise the opposed tooth 39 from its engagement with the teeth 38 of the ratchet 36 and swing it to a position in which it will not interfere with subsequent rotation of the shaft. Since the tapes 23 are highly flexible, the transitional changes of the glass sheet, as it softens and settles toward the mold shaping surfaces, are intimately supported and assimilated by the tapes and the progressively arching contour of the glass is carried downwardly with no stress being enforced in any area. As illustrated in the phantom lines of Fig. 4, as the pairs of reels 24 and 25 (or 56 and 57 as the case may be) are rotated to unwind the tapes therefrom, the increasing length is equally distributed throughout the upper flights 27 of the tapes 23, as indicated in broken line at 65, so that the gradual arching descent of the glass may progress in a substantially vertical direction until it settles on and into bent conformity with the shaping surfaces 15 as indicated in broken line by the numeral 66. When the glass sheet thus becomes supported on the shaping surfaces 15 of the mold, further lengthening of the tapes will completely remove the same from supporting contact with respect to the glass.

The above described sequence of bending operation may be produced in a mechanical manner by means of conventional gears and gear rack mechanisms positioned along the path of movement of the bending apparatus as it is borne through heat zones of a furnace by the customary, driven rollers. However, another mode of operation is equally well adapted to this method of glass bending, such as that carried out in a "car bottom" furnace. According to this mode of operation, the bending apparatus is placed on trucks or cars which are constructed so as to constitute the enclosed, though movable, bottom portion of the furnace. At the appropriate interval in the heating of the glass, which may be determined by its condition or heating cycles of the furnace, the operator inserts a tool through a port in the furnace wall.

Now, and by means of this tool, the handled end 42 of the shaft 26 is engaged and the pawl 37 released from its engagement with the ratchet wheel 36. By slowly turning the tool, the operator can control the rate of descent of the glass, by the amounts of tape fed into the upper flights thereof, and until it is in complete registration with the shaping surfaces of the mold and the tapes further lowered from their supporting relation to the glass.

Figure 7:
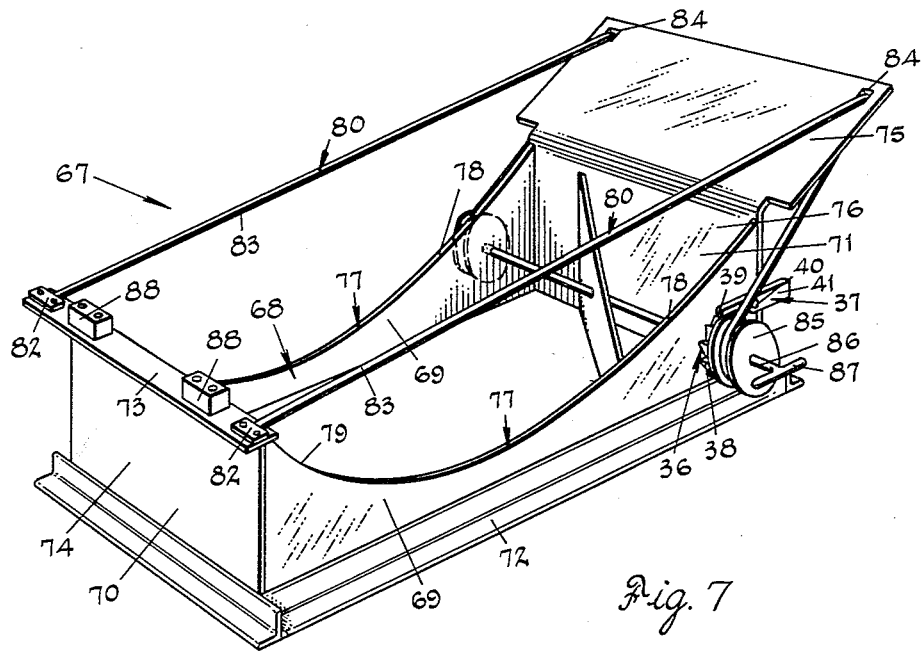
Fig. 7 is a perspective view of a bending apparatus wherein a modified manner of operating the glass supporting tapes is employed.
Figure 8:
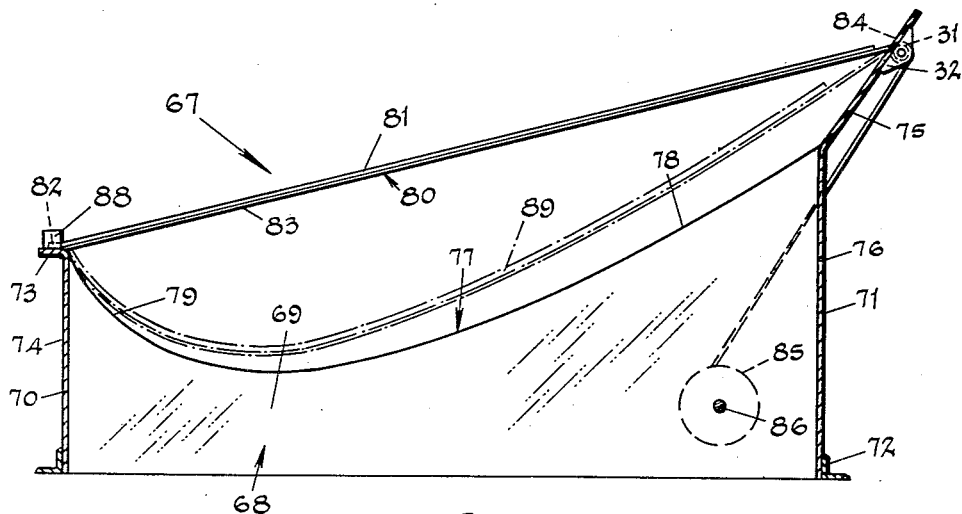
Fig. 8 is a longitudinal vertical cross-sectional view of the apparatus shown in Fig. 7.

In some instances of bending, it has been found possible to employ this same flexible support of the glass by means of tapes which are increased in the length of their effective supporting spans from one end only. According to this embodiment of the invention, one end of each tape is secured to an end wall of the mold and one reel is employed to serve out the additional lengths of tape from the opposite end of the mold. Thus, as illustrated in Figs. 7 and 8, this method of supporting a glass sheet or sheets during the bending thereof may be employed, in a further modified manner, so that the sheets can be shaped into curvatures which essentially combine arcuate surfaces described by a short radius and a materially longer radius and defined by a curved contour broadly resembling an exaggerated J in appearance.

As herein provided, this manner of bending is made possible on a bending apparatus of modified construction in which the flexible supporting tapes are arranged to support the sheet or sheets of glass while one end remains substantially stationary and the opposite end is moved angularly downward as the glass becomes softened and the effective spans of the tapes are lengthened. A bending apparatus of this modified construction, designated in its entirety by the numeral 67 in Figs. 7 and 8, comprises a mold 68 having a generally rigid frame which includes side walls 69 and end walls 70 and 71. The assembled relation of these walls may, or may not, be of the character which permits ready substitution of the side walls and the shaping surfaces formed thereon, as has previously been described in connection with Figs. 4 and 5. As herein shown, the side walls 69 are fixedly secured to the end walls 70 and 71 along their vertical, abutting edges by welding or like methods. A base 72, formed by angle iron sections, is welded to and along the lower margins of the side and end walls to reenforce their assembly.

According to the character of the bend produced on the bending apparatus of this modified construction, one, or the end wall 71 is materially higher than the opposite wall 70 and each wall is formed to orient the support for the glass in a plane that is angularly disposed to the horizontal. The wall 70 is thus formed along its upper edge to provide a ledge 73 which is bent outwardly at substantially a right angle to the lower vertical portion 74 of the wall. The wall 71 is formed to provide a similar ledge or so-called "ear" 75 which is disposed at an angle to the lower vertical portion 76 of said wall. The ledge 73 and ear 75 are each substantially wider than the lower portions of their respective walls so that the marginal edges of the glass may be supported outwardly of vertical planes described by the side walls 69 and the shaping surfaces 77 formed thereon.

These shaping surfaces 77 of the modified mold construction are located on the upper edges of the side walls 69 and include arcuately and downwardly sloping portions 78 which encompass the major area of the shaping surfaces, and generally sharply curved areas 79. The sloping portions 78 originate at the juncture of the side walls 69 and the end wall 71 while the curved portions 79 rise from the sloping portions 78 of the surfaces 77 to the juncture of said walls 69 and the end wall 70. As will be noted, the walls 70 and 71 are thus of an unequal height so that the glass, when located at one end, will be supported in a plane inclined to the horizontal.

Flexible metal tapes 80 for supporting the glass sheet or sheets, as indicated at 81, are, as previously described, arranged in parallel relation and longitudinally of the mold 68. One end of each tape 80 is secured by a clamping plate 82 to the ledge 73 while the free flights 83 of the tapes pass through openings 84 provided in the ear 75 and are thence directed downwardly to the reels 85. To direct the tapes in this manner, the ear 75 is equipped at each opening 84 with a roller 31 rotatably carried by the bracket 32 as described in connection with Fig. 6.

The reels 85 are fixedly mounted on a shaft 86 extending transversely through and being journaled in the side walls 69. The reels are mounted on said shaft, one on each side of the mold so as to receive and wind their respective tapes 80 thereon. Also as previously described in connection with the mold 10, the shaft 86 carries, in fixed relation, a ratchet wheel 36 having the teeth 38 formed in its periphery. The pawl 37, pivotally mounted on the pin 40, is designed to engage the teeth of the ratchet wheel by its toothed end 39 and be maintained in such engagement, against the force of the weighted end 41, when a taut condition is developed in the tapes and the influence thereof is urged from the reels 85, through the shaft 86 to the ratchet wheel 36. The shaft 86 is manually, or otherwise, rotatable by means of the handle 87 formed at one end.

In order to locate the glass sheet 81 at or against the ledge 73 of the end wall 70, said ledge is provided with locator stops 88, in the form of marinite blocks, against which the sheet is placed while being loaded onto the mold.

In the form of curvature shown particularly in Fig. 8, the guided motion of the glass, when properly softened, is directed toward one end of the mold and, by reason of the modified manner of serving out the tapes 80, the gradual increase of length will influence progressive settling of the glass in an angularly downward direction as is indicated by broken line at 89. When producing a bent sheet of glass to a curvature as expressed by the shaping surfaces 77, the sheet 81 is located on the mold 68 so that one end is received against the locators 88. The body of the sheet, is then lowered onto the tapes 80 when they are in a taut condition. This is produced by the engagement of the pawl 37 in the ratchet wheel 36 on the shaft 86. Now while the sheet is supported at its ends on the respective ends of the mold, or more especially the ledge 73 and the surface of the ear 75 and along the margins of its sides by the tapes 80, the body of the sheet is substantially unsupported above the mold.

When the glass becomes heated to its bending temperature, the handle 87 of the shaft 86 is engaged and the pawl 37 is released from the ratchet wheel 36 and swung therefrom by its weighted end 41. By mechanically or manually turning the shaft 86, additional lengths of tape will be served out or unwound from the reels 85 and carried upwardly over rollers 31 into the effective spans or flights 83. Since one end of the glass is located against the stops 88, it will literally pivot on these stops and effect a settling action in a downwardly swinging manner which is influenced by the angularly downward motion of the body of the glass as the additional tape is unwound. By controlling the gradual unwinding of the tapes 80 from one end only of the mold, the softened glass will tend to settle more readily into the more sharply curved portions of the shaping surfaces and until, with continued lengthening of the tapes, the remainder of the glass is located on said surfaces when the glass in its entirety will have been bent into conformity therewith.

It is to be understood that the forms of the invention herewith shown and described are to be taken as illustrative embodiments only of the same, and that various changes in the shape, size and arrangement of parts may be resorted to without departing from the spirit of the invention or the scope of the subjoined claims.

I claim:

1. Apparatus for bending sheets of glass or like materials, comprising a mold having shaping surfaces conforming to the marginal edges of a bent sheet, continuous means arranged between the ends of the mold for supporting the marginal edges of an unbent sheet above the shaping surfaces, and means for actuating said supporting means to lower the glass sheet when softened into bent conformity with said shaping surfaces.

2. Apparatus for bending sheets of glass or like materials, comprising a mold having end portions and shaping surfaces formed between said end portions conforming to the marginal edges of a bent sheet, flexible means arranged longitudinally of and between the end portions of the mold for supporting an unbent sheet above the shaping surfaces, and means for actuating said flexible supporting means to lower the sheet when softened into bent conformity with said shaping surfaces.

3. Apparatus for bending sheets of glass or like materials, comprising a mold having end portions and shaping surfaces formed between said end portions conforming to the marginal edges of a finally bent sheet, flexible means arranged longitudinally of and between the end portions of the mold for supporting an unbent sheet above the shaping surfaces, and reeling means carrying the flexible means and operable to lengthen said flexible means to lower the glass sheet when softened into bent conformity with said shaping surfaces.

4. Apparatus for bending sheets of glass or like materials, comprising a mold having end portions and shaping surfaces formed between said end portions conforming to the marginal edges of a finally bent sheet, flexible means arranged longitudinally of and between the end portions of the mold for supporting an unbent sheet above the shaping surfaces, reeling means carrying the flexible means and operable to lengthen said flexible means to lower the glass sheet when softened into bent conformity with said shaping surfaces, and means associated with said reeling means to prevent lengthening of said flexible supporting means.

5. Apparatus for bending sheets of glass or like materials, comprising a mold including a frame having end portions and shaping surfaces formed between said end portions conforming to the marginal edges of a finally bent sheet, a pair of flexible supports arranged longitudinally of and between the end portions of the mold frame for supporting an unbent sheet above the shaping surface, said flexible supports being freely supported in the said end portions of the mold frame and adapted to move downwardly to deposit the glass sheet when softened on the said shaping surfaces, and reeling means controlling the effective lengths of said flexible supports and operable to equalize the downward movements thereof.

6. Apparatus for bending sheets of glass, comprising a mold including a frame having end wall portions and shaping surfaces formed between the end wall portions conforming to the marginal edges of a bent sheet of glass, a pair of flexible substantially endless supports, each flexible support including a portion arranged between and freely carried in the upper end of the end wall portions of the frame for supporting an unbent glass sheet above the shaping surfaces, the flexible supports being downwardly movable with the glass sheet when softened to deposit the same on the shaping surfaces at completion of the bending operation, reeling means carried on the frame and receiving the ends of the flexible supports to control the effective lengths thereof, and means associated with said reeling means normally restricting the downward movement of the flexible supports.

7. Apparatus for bending a sheet of glass, said apparatus comprising a mold including a frame having end wall portions and shaping surfaces formed between the end wall portions conforming to the marginal edges of a bent sheet of glass, a pair of flexible tapes arranged longitudinally of and between the end wall portions of said frame, means for freely carrying said tapes in the said end wall portions, reels for receiving the opposite ends of the tapes along the sides of the mold frame, a shaft journaled in said frame and supporting the reels at the opposite ends thereof, means normally restricting rotation of the shaft, said tapes having upper flight portions arranged between the upper ends of the end wall portions of the frame for supporting an unbent sheet of glass above and in registration with the shaping surfaces, and means for rotating the shaft when said restricting means is removed to equally increase the upper flights of the tapes from each end wall portion of the mold frame whereby said tapes settle simultaneously with the glass when softened to lower the same onto and into bent conformity with the shaping surfaces of the mold.

8. Apparatus for bending a sheet of glass, said apparatus comprising a mold including a frame having end wall portions and shaping surfaces formed between the end wall portions conforming to the marginal edges of a bent sheet of glass, a pair of substantially endless metal tapes having upper flights extending longitudinally of and between the upper ends of the end wall portions of said frame for supporting an unbent sheet of glass above the shaping surfaces, a pair of tape receiving reels, a shaft journaled in said frame for supporting the reels thereon, a ratchet wheel fixedly mounted on the shaft, and a counterbalanced pawl pivotally mounted on the frame in engaging relation to the ratchet wheel and adapted to restrict rotation of the shaft and the reels carried thereon when engaging said ratchet wheel, the pair of metal tapes being adapted to settle with the glass sheet when softened and lower the same onto the shaping surfaces when rotation of the reels releases equal portions of said tapes into the upper flights thereof.

9. Apparatus for bending a sheet of glass, said apparatus comprising a mold including a frame having a base and integral end walls, longitudinally disposed walls removably secured to the end walls to form the side walls of the mold, the longitudinally disposed walls having shaping surfaces conforming to the marginal edge of a bent sheet of glass, a pair of substantially endless metal tapes having upper flights arranged between and supported in the end walls of the frame, a shaft journaled in the longitudinally disposed walls, tape receiving reels mounted on the shaft at each end thereof, means for releasably securing the reels to said shaft to turn therewith according to the desired length of tape in the upper flights, the said reels being removable from the shaft to vary the contour of the said shaping surfaces by substitution of the longitudinally disposed walls.

10. Apparatus for bending a sheet of glass, said apparatus comprising a mold including a frame having end wall portions and shaping surfaces formed between the end wall portions conforming to the marginal edges of a bent sheet of glass, a pair of flexible metal tapes, the tapes having one end secured to an end wall portion of the frame and upper flight portions arranged in longitudinal parallel order between the ends of said frame, reels for receiving the opposite ends of the tapes along the sides of the frame, means for freely supporting the tapes in the opposite end wall portion of the said frame and directing the same downwardly to said tape receiving reels, the upper flight portions of each tape being operable to support an unbent sheet of glass above the shaping surfaces, and means associated with said tape receiving reels to prevent lengthening of the effective spans of the upper flights of said flexible tapes.

References Cited in the file of this patent

UNITED STATES PATENTS

| | | |
|---|---|---|
| 760,959 | Connington | May 24, 1904 |
| 833,436 | Borland et al. | Oct. 16, 1906 |
| 1,999,558 | Black | Apr. 30, 1935 |

FOREIGN PATENTS

| | | |
|---|---|---|
| 253,716 | Germany | Mar. 27, 1912 |